(12) United States Patent
Li et al.

(10) Patent No.: US 9,465,975 B2
(45) Date of Patent: Oct. 11, 2016

(54) THREE-DIMENSIONAL DATA PROCESSING AND RECOGNIZING METHOD INVOLVING INSPECTING AN OBJECT AND EXTRACTING DATA MATCHING TO FEATURES

(71) Applicants: NUCTECH COMPANY LIMITED, Beijing (CN); TSINGHUA UNIVERSITY, Beijing (CN)

(72) Inventors: Mingliang Li, Beijing (CN); Zhiqiang Chen, Beijing (CN); Yuanjing Li, Beijing (CN); Li Zhang, Beijing (CN)

(73) Assignees: NUCTECH COMPANY LIMITED, Beijing (CN); TSINGHUA UNIVERSITY, Beijing (CN)

( * ) Notice: Subject to any disclaimer, the term of this patent is extended or adjusted under 35 U.S.C. 154(b) by 333 days.

(21) Appl. No.: 14/136,402

(22) Filed: Dec. 20, 2013

(65) Prior Publication Data

US 2014/0185873 A1    Jul. 3, 2014

(30) Foreign Application Priority Data

Dec. 27, 2012 (CN) .......................... 2012 1 0580652

(51) Int. Cl.
*G06K 9/00* (2006.01)

(52) U.S. Cl.
CPC ....... *G06K 9/00201* (2013.01); *G06K 2209/09* (2013.01)

(58) Field of Classification Search
CPC ................ G01N 2223/643; G01N 2223/639; G01N 2223/419; G01N 23/046; G01N 23/10; G01T 1/2985; G01T 2207/10081; G01T 2207/30112; G01T 7/0004
See application file for complete search history.

(56) References Cited

U.S. PATENT DOCUMENTS

| | | | |
|---|---|---|---|
| 4,687,933 A | 8/1987 | Loy | |
| 5,006,299 A | 4/1991 | Gozani et al. | |
| 5,114,662 A | 5/1992 | Gozani et al. | |
| 5,598,453 A | 1/1997 | Baba et al. | |
| 6,026,171 A | 2/2000 | Hiraoglu et al. | |
| 6,148,095 A | 11/2000 | Prause et al. | |
| 6,539,330 B2 | 3/2003 | Wakashiro | |
| 7,347,622 B2 | 3/2008 | Sadakane et al. | |
| 7,362,847 B2 | 4/2008 | Bijjani | |
| 7,945,017 B2 | 5/2011 | Chen et al. | |
| 8,791,957 B2 | 7/2014 | Kadomura et al. | |
| 2002/0029127 A1 | 3/2002 | Wakashiro | |
| 2006/0002585 A1* | 1/2006 | Larson ................ | G06T 7/0004 382/103 |

(Continued)

OTHER PUBLICATIONS

U.S. Office Action dated Dec. 23, 2015 in corresponding U.S. Appl. No. 14/136,462.

(Continued)

*Primary Examiner* — Vu Le
*Assistant Examiner* — Guillermo Rivera-Martinez
(74) *Attorney, Agent, or Firm* — Pillsbury Winthrop Shaw Pittman LLP

(57) ABSTRACT

A three-dimensional data processing and recognizing method including scanning and re-constructing an object to be detected so as to obtain three-dimensional data for recognition of the object to be detected; and extracting data matching to features from the three-dimensional data, so that the extracted data constitutes an interested target in order to display and recognize the object to be detected. A quick method to recognize an object to be detected, such as the shapes of cuboid, cylinder, and cutting tool, and so on.

20 Claims, 8 Drawing Sheets

(56) References Cited

U.S. PATENT DOCUMENTS

| | | | |
|---|---|---|---|
| 2006/0290695 A1* | 12/2006 | Salomie | G06T 17/20 345/420 |
| 2007/0041491 A1 | 2/2007 | Sadakane et al. | |
| 2007/0133744 A1 | 6/2007 | Bijjani | |
| 2007/0200566 A1* | 8/2007 | Clark | G01V 5/0008 324/318 |
| 2008/0049973 A1* | 2/2008 | Hermosillo Valadez | G06K 9/4609 382/103 |
| 2008/0181357 A1* | 7/2008 | Bendahan | G01T 1/1603 378/6 |
| 2009/0092220 A1 | 4/2009 | Chen et al. | |
| 2010/0046704 A1* | 2/2010 | Song | G01N 23/04 378/57 |
| 2010/0208972 A1 | 8/2010 | Bouchard et al. | |
| 2011/0081071 A1* | 4/2011 | Benson | G06T 11/005 382/154 |
| 2011/0085695 A1* | 4/2011 | Yilkiz | G06T 7/004 382/100 |
| 2011/0172972 A1 | 7/2011 | Gudmundson et al. | |
| 2011/0228896 A1* | 9/2011 | Peschmann | G01N 23/223 378/5 |
| 2011/0304619 A1* | 12/2011 | Fu | G06T 17/00 345/420 |
| 2014/0185874 A1 | 7/2014 | Li | |
| 2014/0185923 A1 | 7/2014 | Chen | |

OTHER PUBLICATIONS

Najla Megherbi et al., "A Classifier Based Approach for the Detection of Potential Threats in CT Based Baggage Screening," 2010 IEEE International Conference on Image Processing (ICIP), pp. 1833-1836 (Sep. 26-29, 2010).

Notice of Allowance as issued in U.S. Appl. No. 14/136,426, dated May 11, 2015.

U.S. Office Action mailed Apr. 22, 2016 in corresponding U.S. Appl. No. 14/136,462.

* cited by examiner

THREE-DIMENSIONAL DATA PROCESSING AND RECOGNIZING METHOD INVOLVING INSPECTING AN OBJECT AND EXTRACTING DATA MATCHING TO FEATURES

CROSS-REFERENCE TO RELATED APPLICATION

This application claims the benefit of Chinese Patent Application No. 201210580652.8 filed on Dec. 27, 2012, the disclosure of which is incorporated herein in its entirety by reference.

FIELD

The present invention relates to three-dimensional data processing and recognizing, and more particularly, to intelligent recognition of prohibited articles in security inspection apparatuses by CT or to be detected articles in nuclear magnetic resonance systems.

BACKGROUND

The civil aviation transportation industry has become a primary target of terroristic activities, since it has characteristics such as a large number of passengers, susceptibility to easy attack and a large effect afterwards.

After the terrorist attacks occurred on Sep. 11, 2001, the U.S. government put additional aviation safety inspections into practice, which demand inspection for explosives of all selected baggage. Known explosive detection systems obtain images of the contents in packages by X-ray (radioscopy) or CT techniques. The U.S. government regulates that all selected baggage must be inspected with respect to explosives by techniques certified by the Transportation Security Agency (TSA), starting from December of 2001. So far, the only one which has been certified by the TSA is CT technology.

Currently, the majority of security inspection CT machines all can obtain three-dimensional CT data. Since passenger flow volume at airport is very large, explosive detection systems for consigned and hand baggage require a high throughput. There is an urgent need for a solution to intelligently recognize prohibited articles, which can reduce working intensity, decrease anthropogenic factors and increase the throughput.

SUMMARY

In view of this, there is indeed a need for a new three-dimensional data processing and recognizing method used in security inspection CT machines.

In view of this, an object of the present invention is to alleviate at least one aspect of the above problems and defects in the prior art.

According to one aspect of the present invention, there is provided a new three-dimensional data processing and recognizing method, comprising: scanning and re-constructing an object to be detected so as to obtain three-dimensional data for recognition of the object to be detected; and extracting data matching to features from the three-dimensional data, so that the extracted three-dimensional data constitute one or more interested targets in order to display and recognize the object to be detected.

An embodiment of the present invention can make an initial recognition of the object to be detected since three-dimensional data thereof can be extracted by a method of matching features. The shapes of the object to be detected can be further recognized through analysis and calculation of one or more interested targets, for example based on points, lines and/or planes, thereby recognizing shapes of prohibited articles such as cutting tools, cylinders and cuboids. Any kind of CT system can adopt such a method to recognize dangerous articles. Other systems generating three-dimensional data, for example, nuclear magnetic resonance system or the like can also adopt such a method, to recognize an interested target. That is, the three-dimensional data is searched, extracted, merged, counted and recognized in terms of shapes, by feature data of the suspect object, for example, dangerous articles or prohibited articles. As image segmentation of the three-dimensional data is still relatively difficult up to now, and accuracy and generality thereof are not so good, an embodiment of the present invention solves the problems of searching, preparing statistics and recognizing in terms of shape for an interested target, starting from another viewpoint.

BRIEF DESCRIPTION OF THE DRAWINGS

These and other aspects as well as advantages of the present invention will become apparent and readily understood from the description of the preferred embodiments taking in conjunction with the accompanying drawings, in which.

DETAILED DESCRIPTION OF THE EMBODIMENTS

Figure 1:
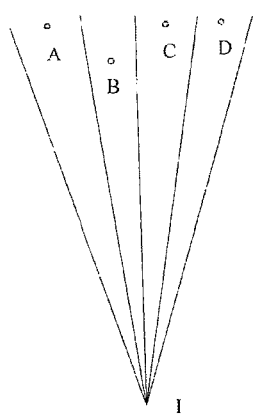
FIG. 1 is a schematic view of eliminating some data points absent in a surface.
Figure 2:
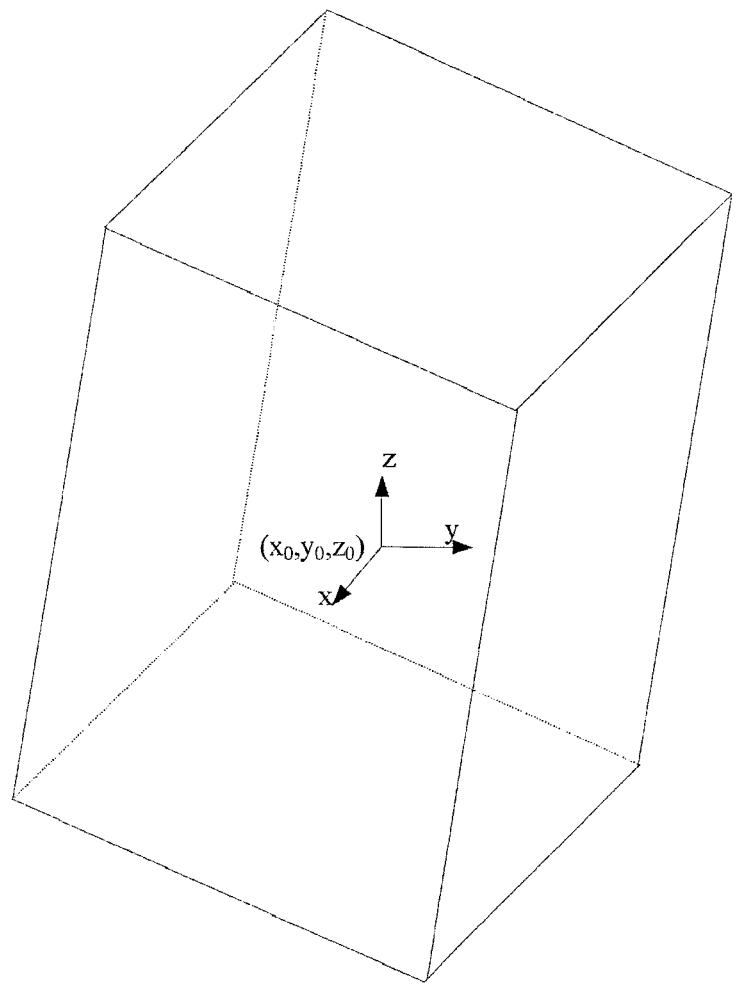
FIG. 2 is a schematic view showing an interested target and a selected origin of coordinates inside thereof.

Technical solutions of the present invention will be described hereinafter in more detail by the way of embodiment with reference to FIGS. 1-8 of the attached drawings, wherein the same or like reference numerals refer to the same or like elements throughout the specification. The explanation of the embodiment of the present invention with reference to the accompanying drawings is intended to interpret the general inventive concept of the present invention, rather than being construed as a limiting to the present invention.

Taking CT image data obtained by scanning and re-constructing of a security inspection CT system as an example, an embodiment of the present invention explains how to recognize prohibited articles or dangerous articles by a three-dimensional data processing and recognizing method. Note that the skilled person in the art should understand that the present three-dimensional data processing and recognizing method is also applicable to a nuclear magnetic resonance system or the like, so as to recognize one or more interested targets.

The present general concept is to perform searching, extraction, merger, statistical analysis and/or shape recognition on three-dimensional data obtained by scanning and re-constructing of a security inspection CT system by using feature data of one or more targets of interest or suspected targets, for example, dangerous articles or prohibited articles. Taking into consideration the shortcomings of schemes in the prior art, that image segmentation of three-dimensional data is still relatively difficult and the accuracy and universality is not so good, and so on, an embodiment of the present invention proposes the present three-dimensional data processing and recognizing method from a different viewpoint thereto. Further, an embodiment of the present invention solves technical problems to perform searching, statistics and shape recognition with respect to one or more interested targets.

The present three-dimensional data processing and recognizing method will be described in detail below with reference to FIGS. 1-8 in combination with the following examples.

The present three-dimensional data processing and recognizing method mainly includes: data processing, constructing surface data from the three-dimensional data, and recognizing shape and dimension (or on basis of the shape and dimension of the one or more interested targets). In addition, an embodiment of the present invention provides a quick recognizing method for articles to be inspected having shapes such as cuboids, cylinders and/or cutting tools.

Data Processing

At first, the security inspection CT system scans the object to be detected and re-constructs it to obtain CT image data (i.e., three-dimensional data). And then, prohibited articles (such as cutting tools) may be recognized based on the obtained three-dimensional data.

By using feature data of the prohibited articles, the obtained three-dimensional data is searched and merged and the three-dimensional data matching to such feature data is extracted, thereby one or more interested targets are produced or constituted by the extracted three-dimensional data. The prohibited articles can be common dangerous goods, such as cutting tools, explosives, guns and the like. The feature data can be data about composition materials of the common dangerous articles, for example, iron, copper, or heavy metals. Such data can be any one of attenuation coefficient data, density data and atomic number data (or energy spectrum data of energy spectrum CT), and any combination thereof. Typically or preferably, the data can be density data and/or the atomic number data.

Among the matched three-dimensional data, adjacent data points are merged and classified as one group. Images of these merged three-dimensional data can be displayed individually or highlighted, for an inspector's inspection. A number of data points among the merged three-dimensional data can be counted to estimate a dimension of a prohibited article. Of course, it is possible at this time to make statistics on mass, position, density and atomic number where the merged three-dimensional data are located, to respectively derive a mean value thereof, so that more specific information on position, volume, mass, or material species of the one or more interested targets located in the articles to be inspected can be obtained. These would help to further recognize prohibited articles. It should be understood that whether the articles to be detected or inspected are drugs or explosives, can be recognized in dependency of their density and atomic number.

It should be noted that one or more interested targets formed by the extracted three-dimensional data or one or more interested targets formed by the merged three-dimensional data can be used to perform the step of constructing surface data from the three-dimensional data, before a step of recognizing a shape and size.

Constructing Surface Data from the Three-Dimensional Data

Herein, taking one or more interested targets formed by the merged three-dimensional data as an example, the step of "constructing surface data from the three-dimensional data" is described in detail. It should be understood that the step of "constructing surface data from the three-dimensional data" can also be performed on basis of one or more interested targets formed by the extracted three-dimensional data.

Specifically, the merged three-dimensional data constitutes or makes up a three-dimensional target (i.e., an interested target). Firstly, one point I is selected within the interested target. Desirably, a method of selecting the point I includes: selecting a maximal value and a minimal value of the data within the merged three-dimensional data in directions of x, y, z axes of a rectangular coordinate system (herein, the direction of x, y, z axes of a rectangular coordinate system can be arbitrarily selected, as long as any two of the three directions are perpendicular to each other, similarly hereinafter); and respectively calculating a median of the maximal value and the minimal value in the above described three directions, wherein coordinates of the median can be selected as coordinates of the selected point I.

It is further noted that with respect to some interested targets having abnormal shapes, after finding out the point I, it is possible to check whether the point I has adjacent data in three dimensional directions (i.e., the three-dimensional data of the interested target in forward, backward, left, right, upward, downward directions thereof). If not, it is necessary to again find a point near the point I as a new point I, which can satisfy the above condition. As such, it can be sure that the point I will always fall within the interested target regardless of its shape.

A spherical coordinate system is established with the point I as the origin of the coordinates. In the spherical coordinate system, an angle ($\theta$, $\phi$) of each point among the merged solid data (the three-dimensional data) and a distance thereof from the point I are calculated, wherein $0 \leq \theta \leq \pi$, $0 \leq \phi < 2\pi$ (in a physical sense, $\theta$ is a zenith angle, and $\phi$ is an azimuthal angle). $\Delta\theta$ and $\sin\theta\Delta\phi$ are set and a point within each solid angle $\sin\theta\Delta\phi\Delta\theta$, which is farthest away from the point I, is selected as one of the surface data.

Desirably, some data out of the surface can be eliminated. One means is to obtain an interpolation point of each surface datum (corresponding to each data point) as described above, which is obtained by interpolating surrounding points of the selected point. If a distance of the interpolation point from the point I is larger than a distance of the selected point from the point I, then the selected point which has been considered as a surface data point will be eliminated. Specifically with reference to FIG. 1 (showing four points A, B, C, and D), since the distance of the interpolation point of the point B derived by linear interpolation of points A and C from the point I is larger than the distance of point B from the point I, the point B is eliminated.

After the above eliminating process, the remaining data can be considered as more reliable surface data.

Of course, for some three-dimensional targets or interested targets having hollow cavity structures, there is not only concern with outer surface data of such three-dimensional targets, but also concern with inner surface data thereof. In a manner similar to the above described, when selecting the inner surface data, the point closest to the point I is chosen within each solid angle $\sin\theta\Delta\phi\Delta\theta$ as the inner surface data. Similarly, in the step of eliminating the inner surface data, if the obtained interpolation point of the selected point is closer to the point I than the selected point, then the selected point is eliminated.

In addition, another method to eliminate the data is described as follows. If a ratio of a distance of the interpolation point of the selected point (for example, obtained with respect to the selected point) from the point I to a distance of the selected point from the point I falls within a predetermined range of threshold (taking as an example, [0.95, 1.05]), then the selected point should be kept; otherwise the selected point should be eliminated. As such, the method can also be applicable to eliminating of the above described surface data and inner surface data.

At this time, the constructed surface data can be displayed to the operator, so as to intuitively and clearly observe the shape of the interested target and perform an initial recognition (for example, in shape).

In order to accelerate the algorithm, in certain circumstances, for example an interested target having a very simple shape, it is possible to only construct surface data near the three coordinate axes x, y, and z, without constructing all the surface data of the interested target.

Furthermore, another method to construct the surface data is: as for an interested target, each of three-dimensional data is analyzed; if there are additional data adjacent to it in all three dimensional directions (for example, the upward and downward direction, the left and right direction, and the fore-and-aft direction), then the three-dimensional data can be deemed to be non-surface data; otherwise, the remaining three-dimensional data shall be surface data.

Recognition in Shape and Size

A point I is arbitrarily selected inside the interested target. As described above, referring to FIG. 2, it is desirable to select a median of a maximal value and a minimal value of the three-dimensional data in a direction of respective three x, y, and z coordinate axes as the coordinate $(x_0, y_0, z_0)$ of the point I.

Figure 3:
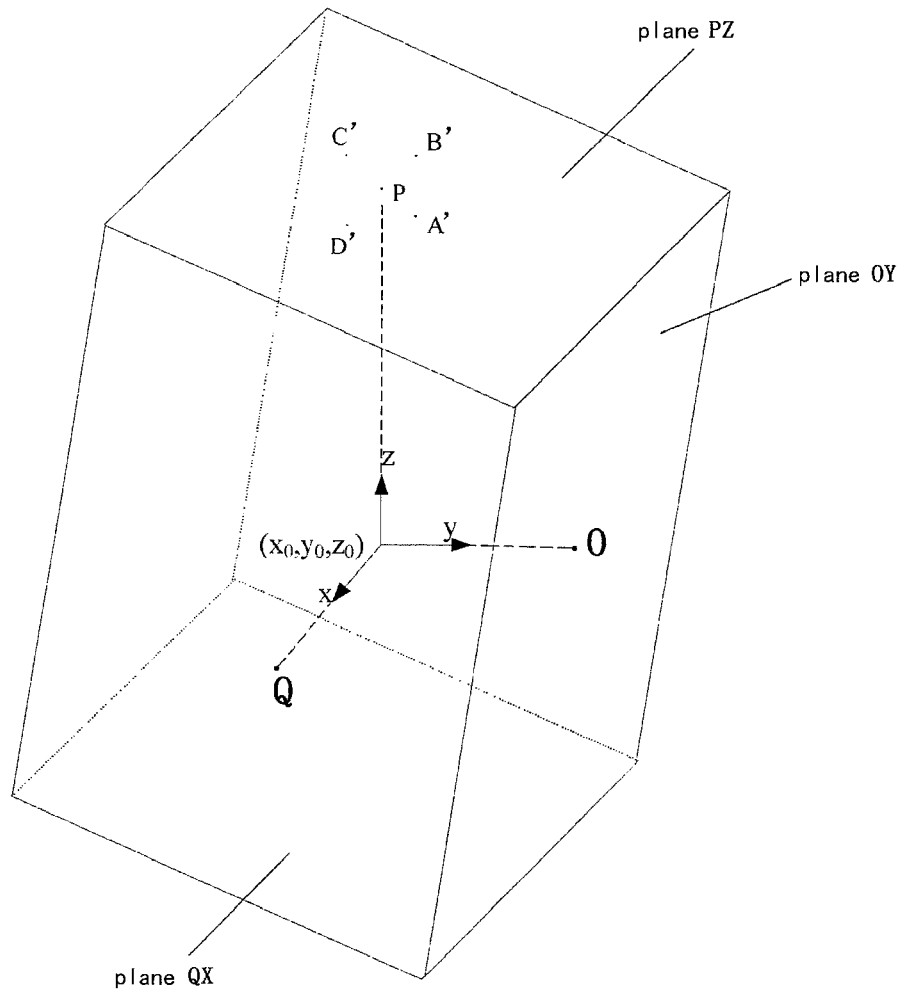
FIG. 3 is a schematic view showing intersection points of three straight lines with the surface and a plurality of data points adjacent thereto, each of the straight lines in line with one direction of a coordinate axis passing through the selected origin of coordinate within the interested target.

Each surface data (x, y, z) among the above constructed surface data is searched to obtain a point P having a minimal value of $(x-x_0)^2+(y-y_0)^2$, that is, as shown in FIG. 3, an intersection point of the z axis with the upper surface (in an embodiment of the present invention, an intersection point of the straight line with the surface is an approximate intersection point, since the surface consists of a plurality of discrete data points). If it is defined as $z>z_0$ or $z<z_0$, one intersection point can be obtained respectively at the upper surface and the lower surface.

As such, a point Q is obtained, having a minimal value of $(y-y_0)^2+(z-z_0)^2$, that is, an intersection point of the x axis with the front surface as shown in the FIG. 3. If it is defined as $x>x_0$ or $x<x_0$, one intersection point can be obtained respectively at the front surface and the rear surface.

As such, a point O is obtained, having a minimal value of $(z-z_0)^2+(x-x_0)^2$, that is, an intersection point of y axis with the right surface as shown in the FIG. 3. If it is defined as $y>y_0$ or $y<y_0$, one intersection point can be obtained respectively at the right surface and the left surface.

Herein, for sake of clarity, only intersection points P, Q, O in the positive direction of the x, y, z axes with the corresponding surface are illustrated. Of course, each negative direction of the x, y, z axes will also form an intersection point (not shown) with the respective surface.

Figure 4:
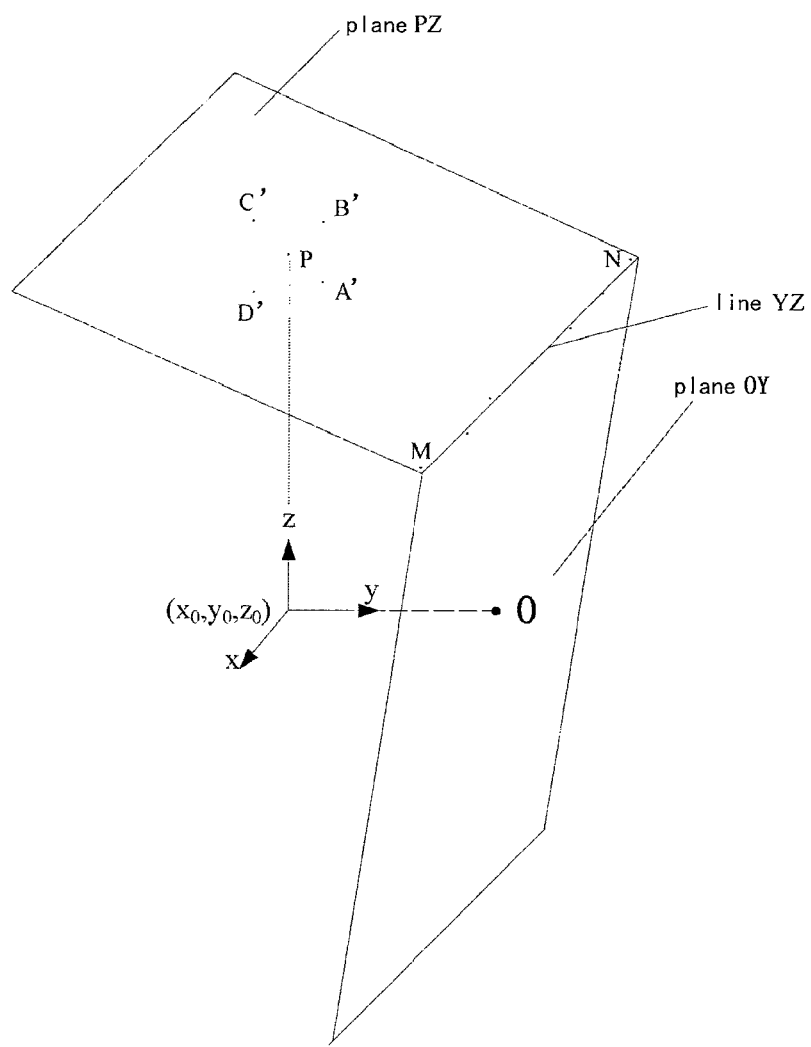
FIG. 4 is a schematic view for recognizing a dimension of the interested target.

Based on the obtained surface data, as shown in FIG. 4, a plurality of points (for example, four points A', B', C', D') nearest the point P are found out around the point P. It is possible to determine whether the above points co-plane with the point P. If so, a plane equation (where a plane PZ is positioned) is provided.

Likewise, with respect to the point Q, a plane QX is obtained by the same process.

Likewise, with respect to the point O, a plane OY is obtained by the same process.

Hereto, the skilled person in the art should understand from the above solving process that two intersection points are obtained by intersecting a straight line passing through a point within the interested target in line with one direction of the three coordinate axes, with the surfaces of the interested target; each intersection point and a plurality of data points adjacent thereto constitute a plane, thereby obtaining a pair of planes of the interested target intersecting with one of three coordinate axes directions.

Specifically, if the intersection points at which straight lines passing through the point I within the interested target in line with positive directions (or instead, negative directions) of the three coordinate axes respectively intersect with the surfaces of the interested target, are obtained by the above solving process, then the three planes PZ, QX, and OY consisting of each intersection point and a plurality of data points adjacent to it can be acquired.

It should be verified whether the obtained three planes PZ, QX, and OY are coplanar or not. If not, a step of determining whether the three planes are coplanar can be omitted.

If the three planes are coplanar, then it is necessary to find new three coordinate axes by a remedy described below. This process continues until the three planes formed by intersection points of the positive (or negative) directions of the new three coordinate axes with the surfaces of the interested target are not coplanar.

If one of the three planes PZ, QX, and OY is coplanar with one of the remaining two planes, then a straight line passing through the point I and parallel to a normal direction of the coplanar plane is selected as a coordinate axis 1.

A method of solving the other two coordinate axes 2 and 3 being perpendicular to the coordinate axis 1 with each other is one of cases (i) and (ii).

Figure 6A:
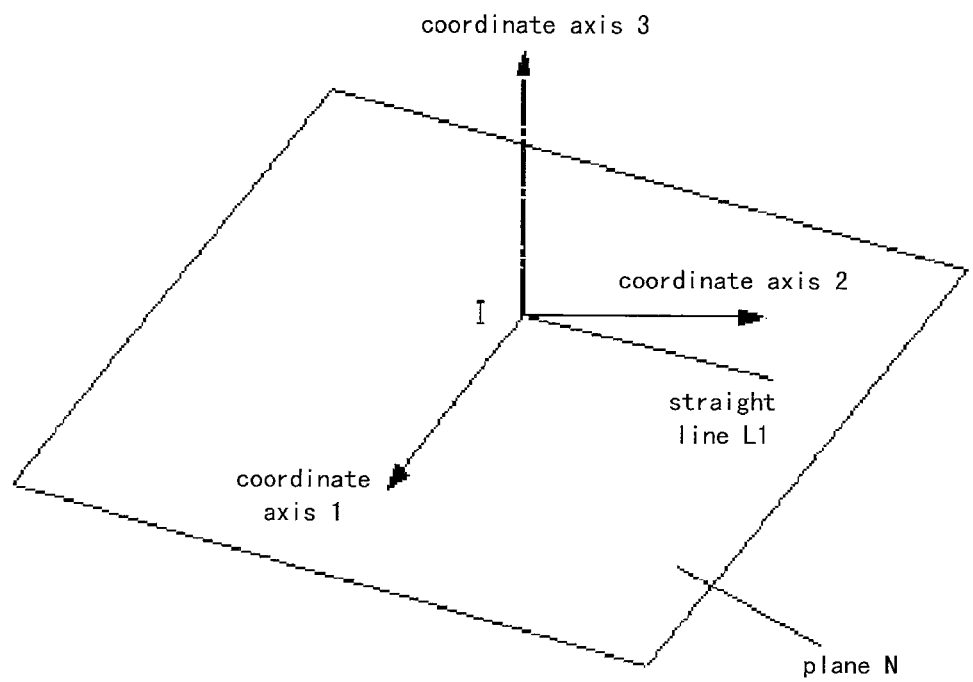
FIGS. 6a and 6b are schematic views of a method to seek a new coordinate axis if coplanarity occurs.

(i) With reference to FIG. 6a, in case the remaining plane is approximately perpendicular to the coplanar planes, a straight line passing through the point I and being parallel to the normal direction thereof is selected as a straight line L1. A perpendicular line to the coordinate axis 1 is made within a plane N consisting of the coordinate axis 1 and the straight line L1, and is used as a coordinate axis 2. A normal line passing through the point I within the plane N is a coordinate axis 3.

Figure 6B:
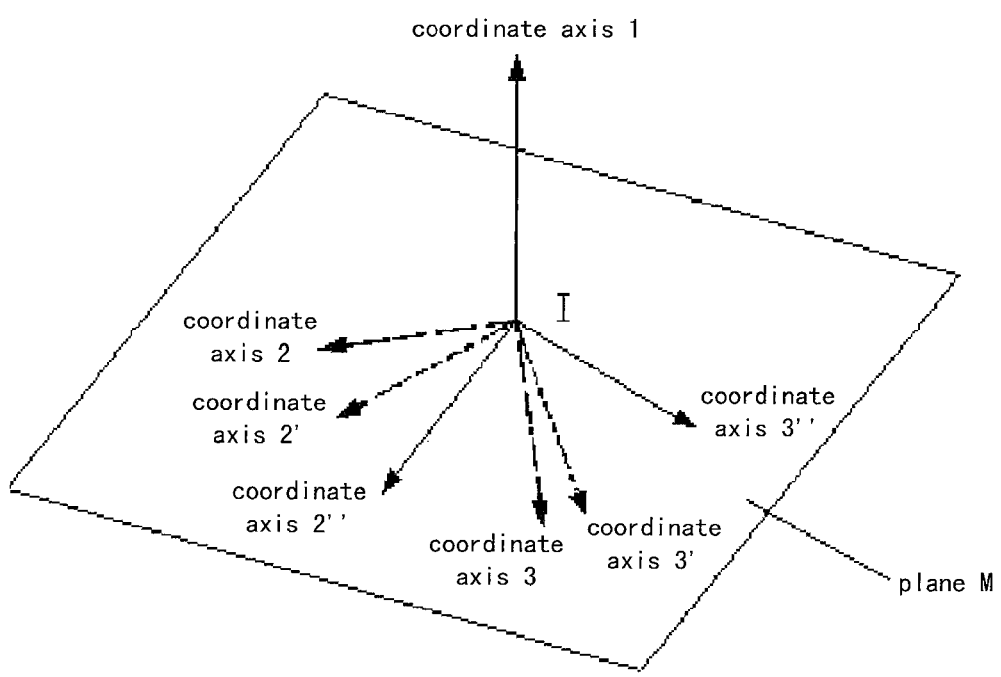

(ii) With reference to FIG. 6b, in case the remaining plane is not approximately perpendicular to the coplanar planes, two straight lines perpendicular to each other are selected within a plane M as the coordinate axes 2 and 3, the plane M passing through the point I and perpendicular to the coordinate axis 1.

A straight line passing through the point I within the plane M is arbitrarily selected as the coordinate axis 2, a line perpendicular to the coordinate axis 2 is the coordinate axis 3. An intersection point of the positive (or negative) direction of the new coordinate axes 1, 2 and 3 with the surfaces of the interested target can be solved, and each intersection point and a plurality of points adjacent to it constitutes a plane. It should be determined whether the three planes described above are coplanar. If two or more of the three planes are coplanar, then the coordinate axis 2 is transformed along one rotation direction within the plane M (for example, to coordinate axes 2', and 2"), and the coordinate axis 3 is accordingly transformed (for example, to coordinate axes 3' and 3"). The above steps are repeated until any two of the above three planes are not coplanar or the coordinate axis 2 is rotated along the one rotation direction by 180 degrees.

Herein, a method to solve intersection points of the positive directions of new coordinate axes 1, 2 and 3 with the surfaces of the interested target can be described as follows:

It is assumed that the surface data point of the interested target is a point A, a vector of the point I to the point A is a vector $\vec{a}$, a unit vector of the positive direction of one of the new coordinate axes 1, 2 and 3 is $\vec{n}$, and $\vec{a} \cdot \vec{n}$ is calculated. If a value of $\vec{a} \cdot \vec{n}$ is above zero, then $|\vec{a}|^2 - (\vec{a} \cdot \vec{n})^2$ is continuously calculated. A point at which a least value of $|\vec{a}|^2 - (\vec{a} \cdot \vec{n})^2$ occurs is an intersection point of the positive direction of the coordinate axis with the surface of the interested target. A method of solving the intersection point of the positive direction of the new coordinate axes 1, 2 and 3 with the surfaces of the interested target is not limited to the application herein, and is also applicable to the process of directly obtaining the intersection points after obtaining the surface data of the interested target.

The new coordinate axes as mentioned herein do not transform coordinates of the surface data in practical calculation. Of course, the coordinate transformation method can be used as an alternative calculating method or a substitute of an embodiment of the present invention. Given that the skilled person in the art can understand details of the above calculating method, they are not described in detail. The use of new coordinate axes mainly utilizes characteristics of perpendicularity of the three axes of the rectangular coordinate system to each other and the positive directions thereof satisfying right-hand rule. Therefore, it should be understood that any calculating methods using such property or similar to the method described herein will fall within the scope of an embodiment of the present invention.

After the above verifying process, if the directions of the new coordinate axes 1, 2 and 3 does not correspond to those of the original coordinate axes x, y, z, then the original coordinate axes are replaced by the new coordinate axes 1, 2, 3. Thereafter, the coordinate axes as shown in FIG. 4 are considered to be the directions of the new coordinate axes 1, 2, 3.

As shown in FIG. 4, a method of determining whether a plurality of points are coplanar is as follows: first, selecting three non-collinear points (for example, points A', B', C'), then writing a plane equation thereof, and finally calculating distances of other points (for example, point D') from the plane. If the distance is less than a threshold (such as, a value which is obtained by dividing a difference of a maximal value of the coordinate of the surface data in a normal direction of the plane and a minimal value thereof by 100), then they are determined to be coplanar; otherwise they are determined to be non-coplanar.

An intersection line YZ of the plane OY with the plane PZ is calculated, and the data points falling on the intersection line are found out by analyzing the obtained three-dimensional data. A distance MN between two end points M and N is calculated, and is set as a length in the x direction.

Likewise, an intersection line of the plane PZ with the plane QX is calculated, and the data points falling on the intersection line are found out by analyzing the obtained three-dimensional data. A distance between two end points thereof is calculated, and is set as a length in the y direction.

Likewise, an intersection line of the plane QX with the plane OY is calculated, and the data points falling on the intersection line are found out by analyzing the obtained three-dimensional data. A distance between two end points thereof is calculated, and is set as a length in the z direction.

The method of determining whether the points fall on the intersection line can be achieved by calculating whether the distances of the points from the intersection line are less than a certain threshold (such as, a value which is obtained by dividing a difference of a maximal value of the coordinate of the surface data and a minimal value thereof on the intersection line by any value between 50 and 100).

In addition, it is possible to calculate an intersection angle between the intersected planes. If all the intersection angles are approximately 90°, then the interested target can be recognized to have a shape of cuboid.

There are two methods to determine whether the two planes are coplanar:

1. It is assumed that equations of the two planes are respectively a1x+b1y+c1z+d1=0, and a2x+b2y+c2z+d2=0. If it is determined that a1/a2=b1/b2=c1/c2=d1/d2 is approximately true, then the two planes are approximately coplanar; otherwise they are non-coplanar.

2. Because the plane equation is solved by a plurality of points within the plane, the distances of a plurality of points on one of the two planes from the other of the two planes can be calculated; and if the distances of all points on one plane from the other plane are less than a predetermined threshold, then the two planes are determined to be coplanar, otherwise non-coplanar.

Figure 5:
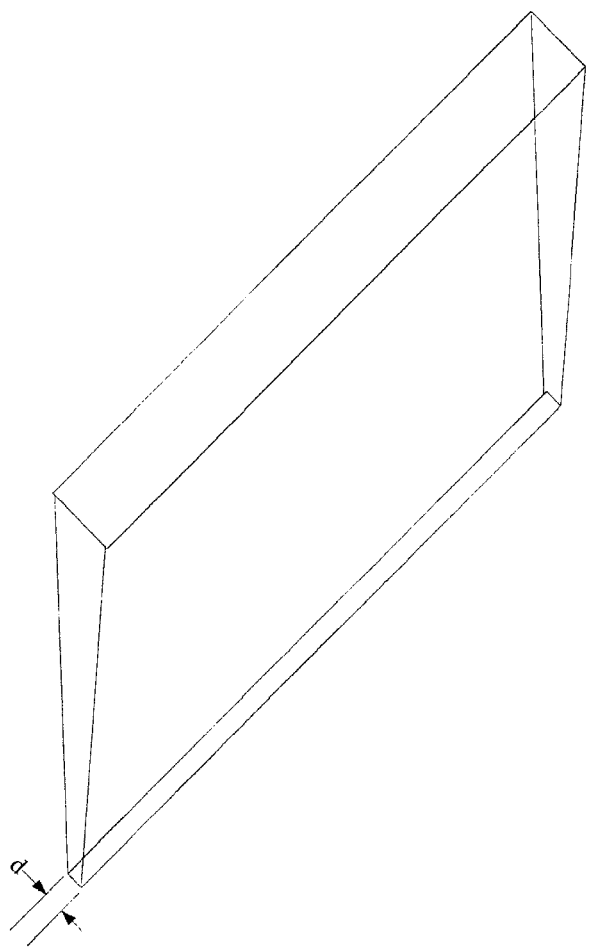
FIG. 5 is a schematic view for recognizing cutting tools.

If the interested target has a shape of cuboid, then it has six planes as shown in FIG. 5 (a front surface, a rear surface, a left surface, a right surface, a upper surface and a lower surface). If a density (or atomic number, or attenuation coefficient) of the interested target corresponds to a feature of cutting tools, then a function of recognizing the cutting tools is turned on. There are 12 intersection lines through the planes intersecting with each other, and the lengths of the intersection lines are calculated (i.e., lengths on x, y, z directions as described above). If the lengths of two intersection lines are much less than those of other (for example 8) intersection lines (such as a ratio thereof is less than 1/10), then the interested target can be determined as a knife-shaped object or cutting-shaped object. Desirably and further, if the intersection line has a least length (for example a thickness d) less than a threshold (for example, 2 mm), then it can be precisely determined as a dangerous cutting tool.

Based on the above descriptions, an embodiment of the present invention provides a quick recognition for an object having the shape of a cuboid, a cylinder, a cutting tool, or the like.

Cuboid Recognition

In a recognition solution of a cuboid, the method still employs the steps of selecting point I, and obtaining planes of the surfaces by intersection points of coordinate axes with surface data, as set out in the parts of "recognition in shape and dimension". As long as a pair of parallel or approximately parallel planes, formed by intersecting of one coordinate axis (one of x, y, z coordinate axes) with the surfaces of the interested target, are found out, it can turn to the following steps.

Figure 7:
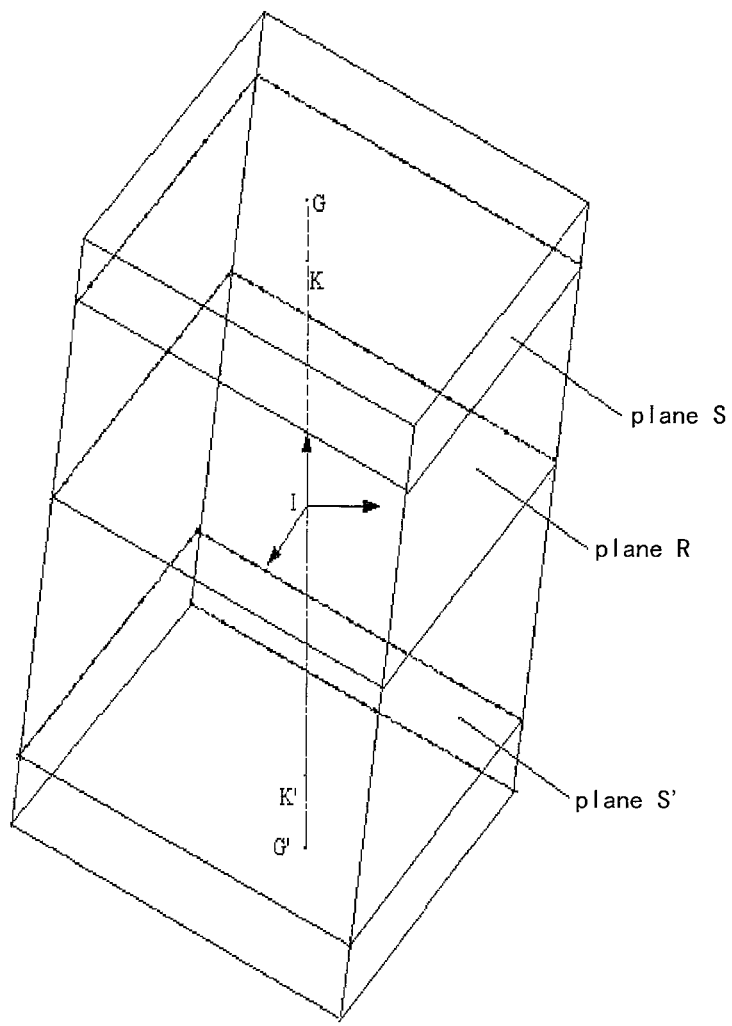
FIG. 7 is a schematic view of a method to recognize a cuboid.

With reference to FIG. 7, it is assumed that an intersection point of a positive direction of one of three coordinate axes intersecting with a pair of parallel or substantially parallel planes of the interested target is point G, and an intersection point of a negative direction of the coordinate axis intersecting with the pair of parallel or substantially parallel planes is point G'.

A plane R is made, which passes through the point I and is parallel to the pair of parallel or substantially parallel planes. The points which fall on the plane R, within the surface data of the interested target, should be analyzed, and if these points constitute a rectangular shape, then the following steps will continue.

A point K is selected on a connection line of the point G to the point I, and lies between the point G and the point I. In the present embodiment, a ratio of the distance of the point K from the point G to the distance of the point K from the point I is 1:a (for example, a=10). A plane S is made which passes through the point K and is parallel to the plane R. The points which fall on the plane S, within the surface data of the interested target, should be analyzed, and if these points constitute a rectangular shape having the same length and width as that of the above described rectangular shape, then the following steps will continue.

A point K' is selected on a connection line of the point G' to the point I, and lies between the point G' and the point I. In the present embodiment, a ratio of the distance of the point K' from the point G' to the distance of the point K' from the point I is 1:a (for example, a=10). A plane S' is made, which passes through the point K' and is parallel to the plane R. The points which fall on the plane S', within the surface data of the interested target, should be analyzed, and if these points constitute a rectangular shape having the same length and width as that of the above described rectangular shape, then the interested target is determined to have a shape of a cuboid.

Dimensions of the cuboid in three directions can be estimated by the length and width of the rectangular shape and the distance between the point G and the point G' (the dimension of the third direction equals to this distance multiplied by an absolute value of cosine of the intersection angle of the coordinate axis with the normal direction of the plane R).

The above arithmetic can be relaxed or simplified. For example, it is possible to calculate an intersection point of only a single direction (positive or negative direction) of one coordinate axis with the surface of the interested target, and to carry out the subsequent calculating operations similar to those as described above. In this way, as compared with the above steps, almost half the amount of calculations can be saved.

Cylinder Recognition

Cylinder recognition is similar to the above solution of cuboid recognition, but for the following differences: a shape obtained by intersecting the interested target with a plane parallel to the pair of parallel or substantially parallel planes is approximately a circle, and then the interested target can be determined to have a cylindrical shape. Finally, a dimension of the cylinder can be estimated by a radius of the circle and the distance of the point G' to the point G.

Cutting Tool/Sheet-Shaped Object Recognition

In a recognition solution of a cutting tool/sheet-shaped object, it still employs the steps of selecting point I, and obtaining planes of the surfaces by intersection points of coordinate axes (for example x coordinate axis) with surface data, as set out in the parts of "recognition in shape and dimension". As long as a pair of parallel or approximately parallel planes, formed by intersecting a certain coordinate axis (one of the x, y, z coordinate axes) with the surfaces of the interested target, are found out, the following steps can be performed.

Figure 8:
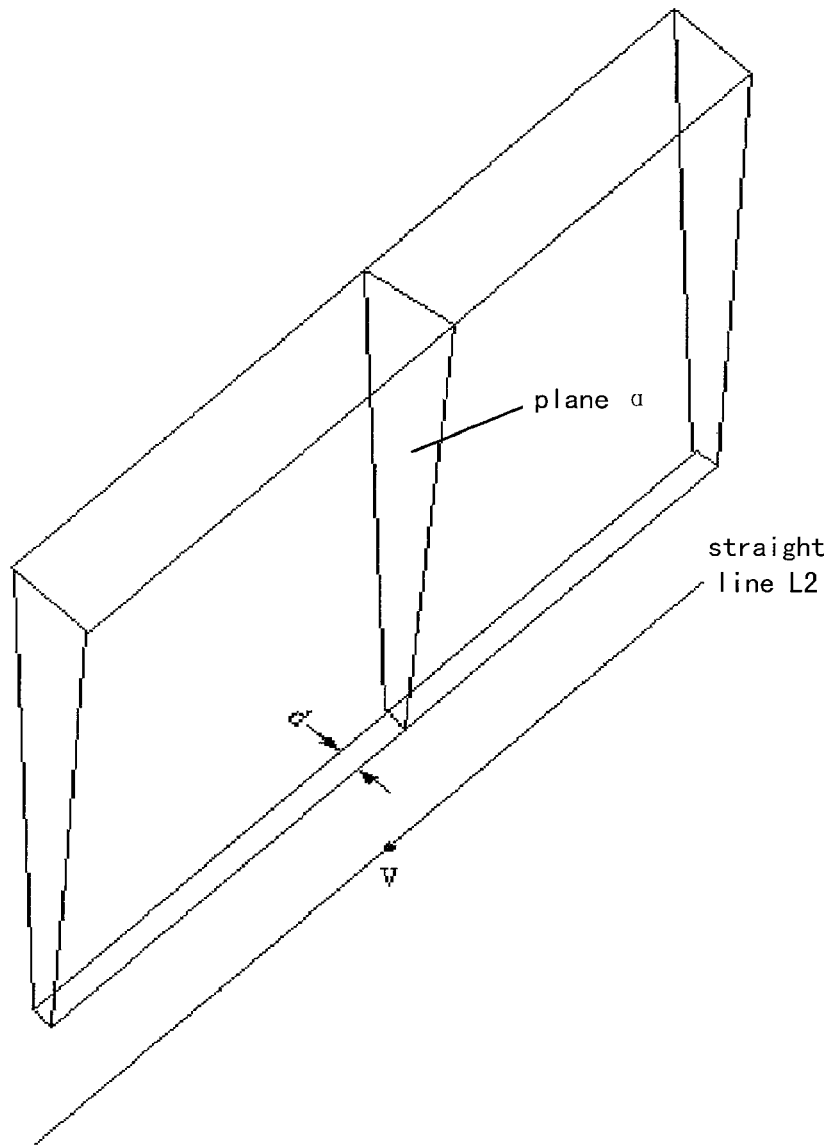
FIG. 8 is a schematic view of a method to recognize a cutting tool.

With reference to FIG. 8, when a pair of parallel or substantially parallel planes of one coordinate axis with the surfaces of the interested target is found out, the intersection angle of the two planes can be calculated. If the intersection angle is less than a threshold (for example, 6°; in the case of recognizing a cutting tool like an axe, the threshold can be adjusted to be larger), then it can directly turn to the following steps.

If the above conditions are not satisfied, the coordinate axis can be replaced by for example, the y axis, or even the z axis, to continue the above calculation. Provided that after calculating with the three coordinate axes, it does not find a pair of parallel or substantially parallel planes having an intersection angle less than a threshold, the interested target can be almost determined not to be a cutting tool.

In the case of an intersection angle of the pair of parallel or substantially parallel planes less than the threshold, the following steps are carried out: calculating an intersection line L2 of the pair of parallel or substantially parallel planes; and finding out a point V on the intersection line L2.

One method to do this is, to calculate a projection point V of the point I on the intersection line L2; and to obtain a plane α passing through the point V and with the line L2 as a normal vector. The surface data of the interested target are searched to find out which points fall on the plane α. If these points constitute a trapezoid or substantially a trapezoid, and a shorter bottom side of the trapezoid is less than a threshold (for example, 2 mm), then the interested target can be determined as a dangerous cutting tool.

Of course, before recognizing the interested target as a cutting tool, its composition can be analyzed to determine whether it corresponds to the features of a cutting tool.

The recognition of two-dimensional shapes, for example, rectangular, circle, or trapezoid, can be done with a neural network method or by analyzing a feature.

Concerning the above, an embodiment of the present invention extracts three-dimensional data by matching features, and recognizes shapes of the object by analyzing and calculating based on points, lines and planes, thereby recognizing prohibited articles such as cutting tools. Various CT systems can employ such a method, to recognize dangerous cargos. Other systems generating the three-dimensional data, such as nuclear magnetic resonance systems or the like, can also utilize such a method, to recognize an interested target. That is, the three-dimensional data of the interested target can be searched, extracted, merged, counted, and recognized in shape, by the feature data of the interested target. Since image segmentation of the three-dimensional data is yet relatively difficult, and accuracy and generality is not so good, the present method solves problems of searching, counting and recognizing in shape of the interested target from a different viewpoint.

It should be noted that a method of an embodiment of the present invention is applicable to systems generating three-dimensional data such as CT and nuclear magnetic resonance system, and so on. Although herein, a rectangular coordinate system and a spherical coordinate system are taken as examples to describe the three-dimensional data processing and recognizing method, it should be understood that using other coordinate systems based on an embodiment the present invention or simple development of an embodiment of the present invention all fall within the scope of the present invention.

Although some embodiments of the general inventive concept are illustrated and explained, it would be appreciated by those skilled in the art that modifications and variations may be made in these embodiments without departing from the principles and spirit of the general inventive concept of the disclosure, the scope of which is defined in the appended claims and their equivalents.

What is claimed is:

1. A three-dimensional data processing and recognizing method, the method comprising:
    inspecting an object to be detected with a hardware measurement system;
    based on results of the inspecting the object to be detected, obtaining, by a hardware computer system, three-dimensional data for recognition of the object to be detected;
    extracting data matching to features from the three-dimensional data, so that the extracted data constitutes an interested target in order to display and recognize the object to be detected; and
    analyzing, for each of a plurality of three-dimensional data points of the interested target, if the three-dimensional data point has other adjacent three-dimensional data points in all orthogonal three-dimensional directions, and if so, it will be deemed as non-surface data and if not, it will be deemed as surface data, wherein surface data of the interested target is obtained by an analyzing method of spatial angle distribution, the analyzing method of spatial angle distribution comprising:
    selecting an arbitrary point I within the interested target as an origin of a coordinate system, and then establishing a corresponding spherical coordinate system,
    calculating, for each of a plurality of points of the three-dimensional data, a zenith angle $\theta$ of the three-dimensional data point, an azimuthal angle $\phi$ of the three-dimensional data point, and a distance of the three-dimensional data point from the point I within the spherical coordinates, and
    setting up $\Delta\theta$ and $\sin\theta\Delta\phi$, and selecting a point having a farthest distance from the point I within each solid angle $\sin\theta\Delta\phi\Delta\theta$ as a surface datum.

2. The three-dimensional data processing and recognizing method of claim 1, wherein the data matching to features is obtained by searching the three-dimensional data in conformity with existing data of common dangerous articles and the existing data is any one selected from: attenuation coefficient data, density data, atomic number data, or any combination selected therefrom.

3. The three-dimensional data processing and recognizing method of claim 1, wherein:
    with respect to the data matching to features, adjacent data points are merged and classified as one group, to form an image of the merged interested target, for an inspector to inspect and recognize it;
    with respect to the merged data, a number of data points therein are used to estimate a size of the object to be detected; and
    an average value is obtained by statistics of any one selected from position, mass, attenuation coefficient, density, atomic number, or any combination selected therefrom, of an area in which the merged data is located.

4. The three-dimensional data processing and recognizing method of claim 1, wherein:
    with respect to each surface data point obtained thereby, an interpolation point of the selected point is obtained by an interpolating calculation of its surrounding surface data points and if a distance of the interpolation point from the point I is larger than a distance of the selected point from the point I, then the selected point is eliminated; or
    with respect to each surface data point obtained thereby, an interpolation point of the selected point is obtained by an interpolating calculation of its surrounding surface data points and if a ratio of a distance of the interpolation point from the point I to a distance of the selected surface data point from the point I falls within a predetermined range, then the selected surface data point is kept; otherwise, it is deleted.

5. The three-dimensional data processing and recognizing method of claim 1, wherein:
    in a circumstance of the interested target having a hollow structure, inner surface data of the interested target is recognized by the above analyzing method of spatial angle distribution, a point having a closest distance from the point I within each solid angle $\sin\theta\Delta\phi\Delta\theta$ is selected as one of the inner surface data;
    with respect to each inner surface data point obtained thereby, an interpolation point of the selected point is obtained by an interpolating calculation of its surrounding surface data points and if a distance of the interpolation point from the point I is less than a distance of the selected point from the point I, then the selected surface data point is deleted.

6. The three-dimensional data processing and recognizing method of claim 1, further comprising solving two intersection points of a straight line, passing through a point within the interested target in line with one direction of three coordinate axes directions, with surfaces of the interested target, each intersection point and adjacent data points thereof constitutes a plane, thereby obtaining a pair of planes passing through the two intersection points, the solving method comprising:
    setting the point I within the interested target to have a coordinate $(x_0, y_0, z_0)$;
    searching each surface data $(x, y, z)$ of all the obtained three-dimensional data, to obtain a point at which $(x-x_0)^2+(y-y_0)^2$ has a minimal value, the point being an intersection point of a straight line in line with the z coordinate axis with the corresponding surface;
    likewise, obtaining another point at which $(y-y_0)^2+(z-z_0)^2$ has a minimal value, this point being an intersection point of a straight line in line with the x coordinate axis with the corresponding surface; and
    likewise, obtaining a further point at which $(z-z_0)^2+(x-x_0)^2$ has a minimal value, this point being an intersection point of a straight line in line with the y coordinate axis with the corresponding surface.

7. The three-dimensional data processing and recognizing method of claim 6, wherein:
    an intersection point of a positive direction or a negative direction of the straight line along three coordinate axes passing through the point I within the interested target with the surfaces of the interested target are obtained by the above solving method, and then each intersection point and a plurality of data points adjacent to it constitute three planes, and any two of three planes are not co-planar;

if two or more of the three planes are coplanar, then finding three new coordinate axes by a remedy as follows, until any two of three planes obtained by the intersection points of the positive or negative direction of the three new coordinate axes with the surfaces of the interested target are not co-planar:

provided that one plane of the three planes is co-planar with another plane of the other two planes, a straight line passing through the point I and in line with a normal direction of their co-planar plane is selected as a coordinate axis 1;

a method of solving another two coordinate axes 2 and 3 perpendicular to the coordinate axis 1 with each other is one of cases (i) and (ii);

(i) if a remaining plane is approximately perpendicular to the co-planar plane, then a straight line passing through the point I and in line with a normal direction of the remaining plane is selected as a straight line L1, a line perpendicular to the coordinate axis 1 is obtained within a plane N formed by the coordinate axis 1 and the straight line L1, wherein the perpendicular line is used as a coordinate axis 2 and a normal line of the plane N passing through the point I is used as the coordinate axis 3;

(ii) if a remaining plane is not perpendicular to the coplanar plane, then two straight lines perpendicular to each other are selected within a plane M which passes through the point I and is perpendicular to the coordinate axis 1, as coordinate axes 2 and 3;

after that, an intersection point of a positive or negative direction of the new coordinate axes 1, 2 and 3 with the surfaces of the interested target are solved, and each intersection point and a plurality of data points adjacent to it form a plane, in order to determine whether the newly obtained three planes are coplanar or not, if two or more of the three planes are coplanar, the coordinate axis 2 is transformed along a rotation direction within the plane M, and the coordinate axis 3 is accordingly transformed;

repeating the above steps until any two of the three planes are not coplanar or the coordinate axis is rotated along one direction within the plane M by halfway around.

8. The three-dimensional data processing and recognizing method of claim 7, wherein a method of solving the intersection points of the positive or negative direction of the new coordinate axes 1, 2 and 3 with the surface of the interested target comprises:

a surface data point of the interested target is supposed to be a point A, a vector from the point I to the point A is $\vec{a}$, a unit vector of the positive or negative direction of one among the new coordinate axes 1, 2 and 3 is $\vec{n}$, and $\vec{a} \cdot \vec{n}$ is calculated, if a value of $\vec{a} \cdot \vec{n}$ is above zero, then $|\vec{a}|^2 - (\vec{a} \cdot \vec{n})^2$ is further calculated, and a point at which $|\vec{a}|^2 - (\vec{a} \cdot \vec{n})^2$ has a least value is the intersection point of the positive or negative direction of the coordinate axis with the surface of the interested target.

9. The three-dimensional data processing and recognizing method of claim 6, wherein, upon determining whether the intersection point is coplanar with a plurality of adjacent data points, three non-collinear points are selected first, and their plane equation is determined, and distances of other data points to this plane is calculated;

if such a distance is less than a first predetermined threshold, the point is determined to be in the plane; and otherwise, the point is determined to be out of the plane.

10. The three-dimensional data processing and recognizing method of claim 7, wherein a method of determining whether two planes are coplanar comprises:

(a) assuming equations of the two planes are respectively a1x+b1y+c1z+d1=0, and a2x+b2y+c2z+d2=0, if it is determined that a1/a2=b1/b2=c1/c2=d1/d2 is approximately true, then the two planes are approximately coplanar; otherwise they are non-coplanar; or (b) the distances of a plurality of points on one of the two planes from the other of the two planes are calculated; and if the distances of all points on one plane from the other plane are less than a second predetermined threshold, then the two planes are determined to be coplanar, otherwise non-coplanar.

11. The three-dimensional data processing and recognizing method of claim 7, wherein if a distance of one data point from an intersection line between two planes is less than a third predetermined threshold, then the point is determined to lie on the intersection line, otherwise, not on the intersection line;

a distance between two outermost end points on each intersection line is calculated, to obtain a dimension in each direction of the interested target, and further if all of the intersection angles between the intersecting planes are approximately 90°, then the interested target is determined to be a cuboid;

the cuboid or approximate cuboid has 12 intersection lines in total due to intersections of any two planes therein, and if it is obtained after calculation that two of the intersection lines have much smaller lengths than eight of others, then the interested target is recognized as a cutting-shaped article.

12. The three-dimensional data processing and recognizing method of claim 11, wherein the interested target will be recognized as a cutting tool, if a thickness of the interested target is much less than a length and a width thereof, and any one selected from: the thickness, density, atomic number, attenuation coefficient or a combination selected therefrom, is matched with corresponding features of the cutting tool.

13. The three-dimensional data processing and recognizing method of claim 6, wherein, assuming a respective intersection points G and G' of a positive or negative direction of one of the three coordinate axes with a pair of parallel or approximately parallel planes of the interested target;

drawing a plane R passing through the point I and parallel to surfaces of the pair of parallel or approximately parallel surfaces, and analyzing the surface data points of the interested target which fall on the plane R, if these surface data points constitute a rectangular shape, then the following steps (c1) and/or (c2) are performed;

step (c1): a point K is chosen in a connecting line between the point G and the point I, and lies between the point G and the point I, a plane S is drawn out to pass through the point K and to be parallel with the plane R, the surface data points of the interested target which fall on the plane S are analyzed, if these surface data points constitute a rectangular shape having a same or substantially same length and width as that of the previous described rectangular shape, then the interested target is determined to have a cuboid shape;

step (c2): a point K' is chosen in a connecting line between the point G' and the point I, and lies between the point G' and the point I, a plane S' is drawn out to pass through the point K' and to be parallel with the plane R, the surface data points of the interested target which fall on the plane S' are analyzed, if these surface data points constitute a rectangular shape having a same or substantially same length and width as that of the previous described rectangular shape, then the interested target is determined to have a cuboid shape;

dimensions of the interested target in three directions are estimated by the length and width of the rectangular shape and the distance between the point G and the point G'.

14. The three-dimensional data processing and recognizing method of claim 6, wherein, assuming respective intersection points G and G' of a positive or negative direction of one of the three coordinate axes with a pair of parallel or approximately parallel planes of the interested target;

drawing a plane R passing through the point I and parallel to the pair of parallel or approximately parallel surfaces, and analyzing the surface data points of the interested target which fall on the plane R, if these surface data points constitute a circle shape, then the following steps (d1) and/or (d2) are performed;

step (d1): a point K is chosen in a connecting line between the point G and the point I, and lies between the point G and the point I, a plane S is drawn out to pass through the point K and to be parallel with the plane R, the surface data points of the interested target which fall on the plane S are analyzed, if these surface data points constitute a circle shape having same or substantially same radius as the previous described circle, then the interested target is determined to have a cylindrical shape;

step (d2): a point K' is chosen in a connecting line between the point G' and the point I, and lies between the point G' and the point I, a plane S' is drawn out to pass through the point K' and to be parallel with the plane R, the surface data points of the interested target which fall on the plane S' are analyzed, if these surface data points constitute a circle shape having same or substantially same radius as the previous described circle, then the interested target is determined to have a cylindrical shape;

a dimension of the interested target is estimated by a radius of the circle and the distance between the point G and the point G'.

15. The three-dimensional data processing and recognizing method of claim 6, wherein, calculating an intersecting angle between a pair of parallel or approximately parallel planes, to determine whether this intersecting angle is less than a fourth predetermined threshold, if this intersecting angle is less than a fourth predetermined threshold, an intersecting line L2 of the pair of parallel or approximately parallel planes is calculated;

finding out a point V on the intersecting line L2;

obtaining a plane α passing through the point V and with the line L2 as a normal vector;

searching the surface data points falling on the plane α, if these surface data points constitute a trapezoid or an approximate trapezoid, and shorter bottom side of the trapezoid has a length which is less than a fifth predetermined threshold, then the interested target is determined to be a dangerous cutting tool, wherein a projection point of the point I onto the intersecting line L2 is calculated as the point V.

16. The three-dimensional data processing and recognizing method of claim 15, wherein, if the intersecting angle is equal to or larger than the fourth predetermined threshold, then another pair of parallel or approximately parallel planes are calculated and obtained wherein the pair of planes passing through intersection points are formed by intersecting directions of at least one of the other two coordinate axes with the surfaces of the interested target, an intersecting angle between the another pair of parallel or approximately parallel planes is again calculated, in order to determine whether the intersecting angle is less than the fourth predetermined threshold;

if the intersecting angle is less than the fourth predetermined threshold, the interested target is determined to be a cutting tool, otherwise not a cutting tool.

17. The three-dimensional data processing and recognizing method of claim 15, wherein, before recognizing the cutting tool, a composition of the interested target is analyzed to confirm whether it corresponds to features of the cutting tool.

18. The three-dimensional data processing and recognizing method of claim 1, wherein:

the three-dimensional data is obtained by scanning and re-constructing the object to be detected by a security inspection computed tomography (CT) system or a nuclear magnetic resonance system;

a median of a maximal value and a minimal value of the three-dimensional data in the directions of the x, y and z coordinate axes is chosen as coordinate of the origin of coordinate within the interested target.

19. A non-transitory computer readable medium, the medium comprising instructions configured to cause a hardware computer system to:

cause inspection of an object to be detected with a hardware measurement system;

obtain three-dimensional data based on results of the inspection the object to be detected, for recognition of the object to be detected;

extract data matching to features from the three-dimensional data, so that the extracted data constitutes an interested target in order to display and recognize the object to be detected; and analyze, for each of a plurality of three-dimensional data points of the interested target, if the three-dimensional data point has other adjacent three-dimensional data points in all orthogonal three-dimensional directions, and if so, it will be deemed as non-surface data and if not, it will be deemed as surface data, wherein surface data of the interested target is obtained by an analyzing method of spatial angle distribution, the analyzing method of spatial angle distribution comprising:

selecting an arbitrary point I within the interested target as an origin of a coordinate system, and then establishing a corresponding spherical coordinate system, calculating, for each of a plurality of points of the three-dimensional data, a zenith angle $\theta$ of the three-dimensional data point, an azimuthal angle $\phi$ of the three-dimensional data point, and a distance of the three-dimensional data point from the point I within the spherical coordinates, and setting up $\Delta\theta$ and $\sin\theta\Delta\phi$, and selecting a point having a farthest distance from the point I within each solid angle $\sin\theta\Delta\phi\Delta\theta$ as a surface datum.

20. The non-transitory computer readable medium of claim 19, wherein the data matching to features is obtained by searching the three-dimensional data in conformity with existing data of common dangerous articles and the existing data is any one selected from: attenuation coefficient data, density data, atomic number data, or any combination selected therefrom.

* * * * *